(12) United States Patent
Miller et al.

(10) Patent No.: US 12,321,234 B2
(45) Date of Patent: *Jun. 3, 2025

(54) ENERGY EFFICIENT STORAGE OF ERROR-CORRECTION-DETECTION INFORMATION

(71) Applicant: Rambus Inc., San Jose, CA (US)

(72) Inventors: Michael Raymond Miller, Raleigh, NC (US); Stephen Magee, Apex, NC (US); John Eric Linstadt, Palo Alto, CA (US)

(73) Assignee: Rambus Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/649,031

(22) Filed: Apr. 29, 2024

(65) Prior Publication Data

US 2024/0354191 A1    Oct. 24, 2024

Related U.S. Application Data

(63) Continuation of application No. 18/130,810, filed on Apr. 4, 2023, now Pat. No. 12,001,283, which is a continuation of application No. 17/734,464, filed on May 2, 2022, now Pat. No. 11,645,152, which is a continuation of application No. 16/881,859, filed on May 22, 2020, now Pat. No. 11,347,587, which is a continuation of application No. 15/990,078, filed on May 25, 2018, now Pat. No. 10,705,912.

(60) Provisional application No. 62/516,240, filed on Jun. 7, 2017.

(51) Int. Cl.
*G06F 11/10* (2006.01)
*G06F 3/06* (2006.01)

(52) U.S. Cl.
CPC ........ *G06F 11/1076* (2013.01); *G06F 3/0619* (2013.01); *G06F 3/0625* (2013.01); *G06F 3/0644* (2013.01); *G06F 3/0673* (2013.01); *G06F 11/1048* (2013.01)

(58) Field of Classification Search
None
See application file for complete search history.

(56) References Cited

U.S. PATENT DOCUMENTS

| | | |
|---|---|---|
| 5,909,541 A | 6/1999 | Sampson et al. |
| 6,615,387 B1 | 9/2003 | Williamson et al. |
| 7,293,220 B2 | 11/2007 | Guo et al. |
| 7,830,191 B2 | 11/2010 | Kojima et al. |
| 8,020,068 B2 | 9/2011 | Lee |
| 8,166,378 B2 | 4/2012 | Chen et al. |
| 8,321,756 B2 | 11/2012 | Rueping et al. |

(Continued)

*Primary Examiner* — Guerrier Merant
(74) *Attorney, Agent, or Firm* — The Neudeck Law Firm, LLC

(57) ABSTRACT

Data and error correction information may involve accessing multiple data channels (e.g., 8) and one error detection and correction channel concurrently. This technique requires a total of N+1 row requests for each access, where N is the number of data channels (e.g., 8 data row accesses and 1 error detection and correction row access equals 9 row accesses.) A single (or at least less than N) data channel row may be accessed concurrently with a single error detection and correction row. This reduces the number of row requests to two (2)—one for the data and one for the error detection and correction information. Because, row requests consume power, reducing the number of row requests is more power efficient.

20 Claims, 12 Drawing Sheets

(56) References Cited

U.S. PATENT DOCUMENTS

| | | |
|---|---|---|
| 8,352,805 B2 | 1/2013 | Shaeffer et al. |
| 8,627,174 B2 | 1/2014 | Kim et al. |
| 9,015,399 B2 | 4/2015 | Brewer et al. |
| 9,128,834 B2 | 9/2015 | Dodson et al. |
| 9,218,243 B2 | 12/2015 | Shaeffer |
| 9,337,872 B2 | 5/2016 | Perego |
| 9,450,614 B2 | 9/2016 | Ware et al. |
| 10,705,912 B2 | 7/2020 | Miller et al. |
| 11,347,587 B2 | 5/2022 | Miller et al. |
| 2001/0001158 A1 | 5/2001 | Tetrick |
| 2008/0005646 A1 | 1/2008 | Bains |
| 2008/0098282 A1 | 4/2008 | Chien |
| 2008/0147968 A1 | 6/2008 | Lee et al. |
| 2010/0217915 A1 | 8/2010 | O'Connor et al. |
| 2012/0079352 A1 | 3/2012 | Frost et al. |
| 2012/0311394 A1 | 12/2012 | Masuo |
| 2013/0173991 A1 | 7/2013 | Ware et al. |
| 2014/0185352 A1 | 7/2014 | Chow et al. |
| 2014/0310570 A1 | 10/2014 | Lastras et al. |
| 2014/0351673 A1 | 11/2014 | Ware et al. |
| 2015/0248327 A1 | 9/2015 | Ware et al. |
| 2015/0339202 A1 | 11/2015 | Ware et al. |
| 2015/0347331 A1 | 12/2015 | Park et al. |
| 2016/0173128 A1 | 1/2016 | Ware et al. |
| 2017/0293523 A1 | 10/2017 | Lunadier |

ACCESS, BY A CONTROLLER, MEMORY DEVICES THAT ARE ON A SET OF MEMORY CHANNELS THAT EACH INCLUDE COMMAND, ADDRESS, AND DATA TRANSFER FUNCTIONS THAT OPERATE INDEPENDENTLY OF THE COMMAND, ADDRESS, AND DATA TRANSFER FUNCTIONS OF THE OTHER CHANNELS IN THE SET OF MEMORY CHANNELS
202

ACCESS, BY THE CONTROLLER, A FIRST MEMORY CHANNEL OF THE SET OF MEMORY CHANNELS TO RECEIVE A FIRST DATA WORD GROUP THAT IS STORED CONTIGUOUSLY IN A FIRST ROW OF A FIRST MEMORY DEVICE COUPLED TO THE FIRST MEMORY CHANNEL
204

ACCESS, BY THE CONTROLLER, AND CONCURRENTLY WITH THE ACCESSING THE FIRST MEMORY CHANNEL, AN ERROR CORRECTION DATA CHANNEL TO RECEIVE A FIRST SET OF CHECK BITS ASSOCIATED WITH THE FIRST DATA WORD GROUP.
206

FIGURE 2

```
┌─────────────────────────────────────────────┐
│ OPEN, BY A CONTROLLER, A ROW OF A MEMORY DEVICE │
│    ON AN ERROR CORRECTION DATA CHANNEL      │
│                    502                      │
└─────────────────────────────────────────────┘
                      │
┌─────────────────────────────────────────────┐
│ ACCESS, BY THE CONTROLLER, A FIRST MEMORY CHANNEL │
│ OF A PLURALITY OF INDEPENDENT MEMORY CHANNELS TO │
│  RECEIVE A FIRST DATA WORD GROUP THAT IS STORED  │
│   CONTIGUOUSLY IN A FIRST ROW OF A FIRST MEMORY  │
│   DEVICE COUPLED TO THE FIRST MEMORY CHANNEL, THE │
│     FIRST ROW CORRESPONDING TO THE ROW OF THE    │
│    MEMORY DEVICE ON THE ERROR CORRECTION DATA    │
│                    CHANNEL                       │
│                      504                         │
└─────────────────────────────────────────────┘
                      │
┌─────────────────────────────────────────────┐
│   RECEIVE, BY THE CONTROLLER, A FIRST SET OF CHECK │
│   BITS ASSOCIATED WITH THE FIRST DATA WORD GROUP   │
│   FROM THE OPEN ROW OF THE MEMORY DEVICE ON THE    │
│        ERROR CORRECTION DATA CHANNEL               │
│                      506                           │
└─────────────────────────────────────────────┘
                      │
┌─────────────────────────────────────────────┐
│   ACCESS, BY THE CONTROLLER, A SECOND MEMORY       │
│   CHANNEL OF THE PLURALITY OF INDEPENDENT MEMORY   │
│   CHANNELS TO RECEIVE A SECOND DATA WORD GROUP     │
│   THAT IS STORED CONTIGUOUSLY IN A SECOND ROW OF A │
│   SECOND MEMORY DEVICE COUPLED TO A SECOND         │
│   MEMORY CHANNEL, THE SECOND ROW CORRESPONDING     │
│   TO THE ROW OF THE MEMORY DEVICE ON THE ERROR     │
│            CORRECTION DATA CHANNEL                 │
│                      508                           │
└─────────────────────────────────────────────┘
                      │
┌─────────────────────────────────────────────┐
│   RECEIVE, BY THE CONTROLLER, A SECOND SET OF CHECK │
│   BITS ASSOCIATED WITH THE SECOND DATA WORD GROUP   │
│   FROM THE OPEN ROW OF THE MEMORY DEVICE ON THE     │
│        ERROR CORRECTION DATA CHANNEL                │
│                      510                            │
└─────────────────────────────────────────────┘
```

FIGURE 5

OPEN, BY A CONTROLLER, A ROW OF A MEMORY DEVICE ON AN ERROR CORRECTION DATA CHANNEL
602

ACCESS, BY THE CONTROLLER, A FIRST MEMORY CHANNEL OF A PLURALITY OF INDEPENDENT MEMORY CHANNELS TO RECEIVE A FIRST DATA WORD GROUP THAT IS STORED CONTIGUOUSLY IN A FIRST ROW OF A FIRST MEMORY DEVICE COUPLED TO THE FIRST MEMORY CHANNEL
604

RECEIVE, BY THE CONTROLLER, A FIRST SET OF CHECK BITS ASSOCIATED WITH THE FIRST DATA WORD GROUP FROM THE OPEN ROW OF THE MEMORY DEVICE ON THE ERROR CORRECTION DATA CHANNEL
606

ACCESS, BY THE CONTROLLER, A SECOND MEMORY CHANNEL OF THE PLURALITY OF INDEPENDENT MEMORY CHANNELS TO RECEIVE A SECOND DATA WORD GROUP THAT IS STORED CONTIGUOUSLY IN A SECOND ROW OF A SECOND MEMORY DEVICE COUPLED TO A SECOND MEMORY CHANNEL
608

RECEIVE, BY THE CONTROLLER, A SECOND SET OF CHECK BITS ASSOCIATED WITH THE SECOND DATA WORD GROUP FROM THE OPEN ROW OF THE MEMORY DEVICE ON THE ERROR CORRECTION DATA CHANNEL
610

FIGURE 6

ENERGY EFFICIENT STORAGE OF ERROR-CORRECTION-DETECTION INFORMATION

BRIEF DESCRIPTION OF THE DRAWINGS

FIG. 2 is a flowchart illustrating method of accessing data and error detection and correction information.

FIG. 5 is a flowchart illustrating a method of accessing error detection and correction information from an open row.

FIG. 6 is a flowchart illustrating another method of accessing error detection and correction information from an open row.

DETAILED DESCRIPTION OF THE EMBODIMENTS

The following disclosure relates to, among other things, memory components, memory controllers, and/or systems that have features and/or functionality for error detection and correction. A way of accessing data and error correction information involves accessing multiple data channels (e.g., 8) and one error detection and correction channel concurrently. This allows for efficient storage of the data because the same command and address can be used to access both the error detection and correction information channel and the data channels. However, every access using this scheme requires a total of N+1 row requests, where N is the number of data channels (e.g., 8 data row accesses and 1 error detection and correction row access equals 9 row accesses.) In an embodiment, a single (or at least less than N) data channel row is accessed concurrently with a single error detection and correction row. This reduces the number of row requests to two (2)—one for the data and one for the error detection and correction information. Because row requests consume power, reducing the number of row requests is more power efficient.

Figure 1A:
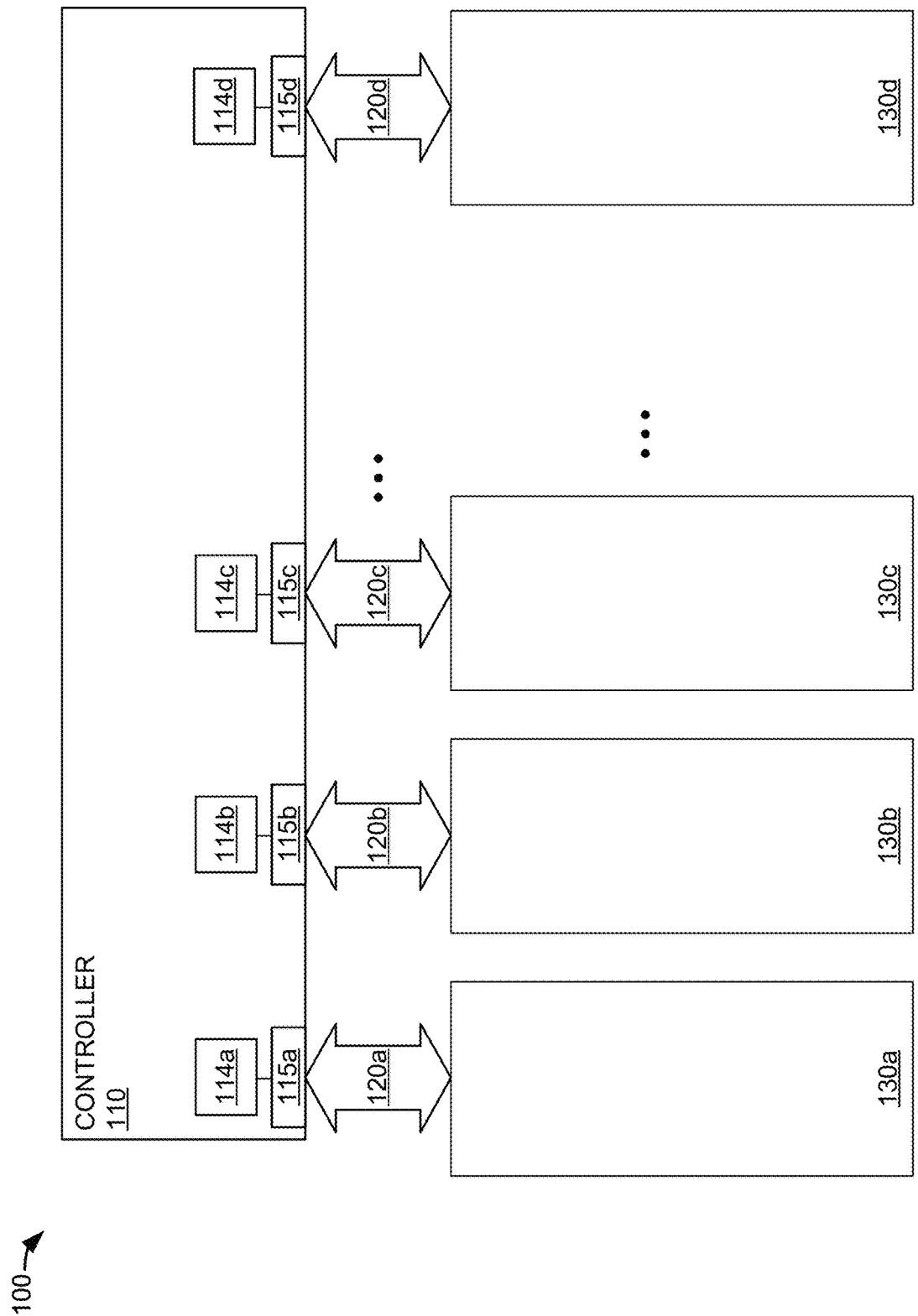
FIG. 1A is a block diagram illustrating a memory system.

FIG. 1A is a block diagram illustrating a memory system. In FIGS. 1A-1E, memory system 100 comprises controller 110, memory channels 120a-120d, and memory devices 130a-130d. Controller 110 includes interfaces 115a-115d and control logic 114a-114d. Memory device 130a is operatively coupled to interface 115a of controller 110 via memory channel 120a. Memory device 130b is operatively coupled to interface 115b of controller 110 via memory channel 120b. Memory device 130c is operatively coupled to interface 115c of controller 110 via memory channel 120c. Memory device 130d is operatively coupled to interface 115d of controller 110 via memory channel 120d.

Control logic 114a of controller 110 is operatively coupled to interface 115a. Control logic 114b of controller 110 is operatively coupled to interface 115b. Control logic 114c of controller 110 is operatively coupled to interface 114c. Control logic 114d of controller 110 is operatively coupled to interface 115d. Each of control logic 114a-114d operates the corresponding interface 115a-115d. Each of control logic 114a-114d can operate independently of each other. Likewise, each of interfaces 115a-115d can be operated independently of each other.

Controller 110 and the memory devices 130a-130d may be integrated circuit type devices, such as are commonly referred to as a "chips". Memory devices 130a-130d may be standalone devices, or may be one or more components of a memory module. A memory controller, such as controller 110, manages the flow of data going to and from memory devices and/or memory modules. A memory controller can be a separate, standalone chip, or integrated into another chip. For example, a memory controller may be included on a single die with a microprocessor, or included as part of a more complex integrated circuit system such as a block of a system on a chip (SOC). Memory devices 130a-130d can include a dynamic random access memory (DRAM) core or other type of memory cores, for example, static random access memory (SRAM) cores, or non-volatile memory cores such as flash. Controller 110 and memory devices 130a-130d may be interconnected with each other in a variety of system topologies including on a PC board (e.g., where the memory is on a module and the controller is socketed to the PC board, or in "die-down" arrangement where one or both of the chips are soldered to the PC board), stacked one on top of another and encapsulated in a single package or each having separate package (package-on-package), both disposed on a shared substrate, on an interposer, or even in a direct-attach arrangement.

Controller 110 is operatively coupled to memory devices 130a-130d to communicate commands, addresses, and data with memory devices 130a-130d. Controller 110 can operate, via memory channels 120a-120d, each of memory devices 130a-130d independently. In other words, each of control logic 114a-114d and interfaces 115a-115d operate the command, address, and data transfer functions of their respective memory channel 120a-120d independently of the other of memory channels 120a-120d.

Controller 110 may be configured to allocate a plurality of memory channels 120a-120d and corresponding memory devices 130a-130d to store data and error detection and correction information. For example, controller 110 may allocate 8 channels and 8 memory devices (illustrated in FIGS. 1A-1E by 120a-120c and 130a-130c, respectively) to store data, and a single remaining channel and memory device (illustrated in FIGS. 1A-1E by 120d and 130d, respectively) to store error detection and correction information. Controller 110 may access all 9 memory channels 120a-120d each time controller 110 performs an access thereby activating 9 rows (i.e., one row in each of 9 memory devices 130a-130d.) However, activating 9 rows for every access may be too power inefficient for some applications.

In an embodiment, memory channels 120a-120d each include respective memory access interfaces that operate independently of the accesses that occur via the other of the memory channels 120a-120d. To be independent, in an embodiment, each of memory channels 120a-120d include command, address, and data transfer functions that operate independently of the command, address, and data transfer functions of the other memory channels 120a-120d. Controller 110 may be configured to concurrently access two or more of memory channels 120a-120d.

Memory channel 120a may be used to access a first data word group that is stored contiguously in a row of memory device 130a. Memory channel 120d may be used by controller 110 as an error detection data channel. Memory channel 120d may be used by controller 110 to access a first group of check bits associated with the first data word group.

In an embodiment, system 100 and/or controller 110 may include a check bit cache to provide the first group of check bits associated with the first data word group. In response to an access to the first data word group, the check bit cache can provide the first group of check bits (which is associated with the first data word group) without using an access via the error detection data channel 120d.

Memory channel 120b may be used to access a second data word group that is stored contiguously in a row of memory device 130b. In an embodiment, the accessed row of memory device 130a is accessed using a first row address on data channel 120a, and the row of memory device 130b using the same row address, but on data channel 120b. In an embodiment, this first row address is also the row of memory device 130d that holds the check bits associated with the first and second data word groups. In an embodiment, the accessed row of memory device 130a is accessed using a first row address on data channel 120a, and the row of memory device 130b using a second, but different, row address. In this case, a third row address into memory device 130d, different first and second row addresses may hold the check bits associated with both or the first and second data word groups.

In an embodiment, memory channels 120a-120d each include respective memory access interfaces that operate independently of the accesses that occur via the other of the memory channels 120a-120d. To be independent, in an embodiment, each of memory channels 120a-120d include command, address, and data transfer functions that operate independently of the command, address, and data transfer functions of the other memory channels 120a-120d. Controller 110 may be configured to concurrently access two or more of memory channels 120a-120d. Controller 110 may operate memory channel 120d as an error detection data channel. Controller 110 may use channel 120d to access a first group of check bits corresponding to data stored in a single row of memory device 130a which is accessed via memory channel 120a. In an embodiment, controller 110 stores this first group of check bits is in a single row of memory device 120d that is accessed via channel 120d.

In an embodiment, a second group of check bits may be stored in the single row of memory device 130d. This second group of check bits are associated with a single row of a memory device 120b which is accessed via memory channel 120b. In an embodiment, controller 110 accesses the first group of check bits and the second group of check bits from the single row of the error detection and correction channel memory device 130d using a single row activate command to access both the first group of check bits and the second group of check bits.

In an embodiment, system 100 includes a check bit data cache. This check bit data cache can provide, without error detection and correction channel memory device 130d being accessed, the first (and/or second) group of check bits. In an embodiment, this check bit cache is included in controller 110.

In an embodiment, controller 110 accesses channel 120a to receive a first data word group that is stored contiguously in a first row of memory device 130a. Concurrently with accessing the first memory channel, controller 110 accesses channel 120d (which is configured as an error correction data channel) to receive a first set of check bits associated with the first data word group. In an embodiment, before accessing channel 120d to receive the first set of check bits, controller 110 may determine whether an error detection and correction data cache holds a copy of the first set of check bits.

When controller 110 accesses error correction data channel 120d concurrently with channel 120a, controller 110 may also receive a second set of check bits associated with a second data word group. In other words, controller 110 may read more check bit data than is strictly required to check the first data word group. This additional check bit data may correspond to check bit data for data word groups that are stored on different memory devices 130a-130c and/or different rows of these devices 130a-130c. In this case, controller 110 may cache this extra data in an error detection and correction data cache. If controller 110 later receives a request to access memory channel 120b to receive a second data word group, and the additional check bit data was stored in the error detection and correction data cache, controller 110 may provide the second set of check bits from the error detection and correction data cache without concurrently accessing the error correction data channel 120d to receive the second set of check bits.

Figure 1B:
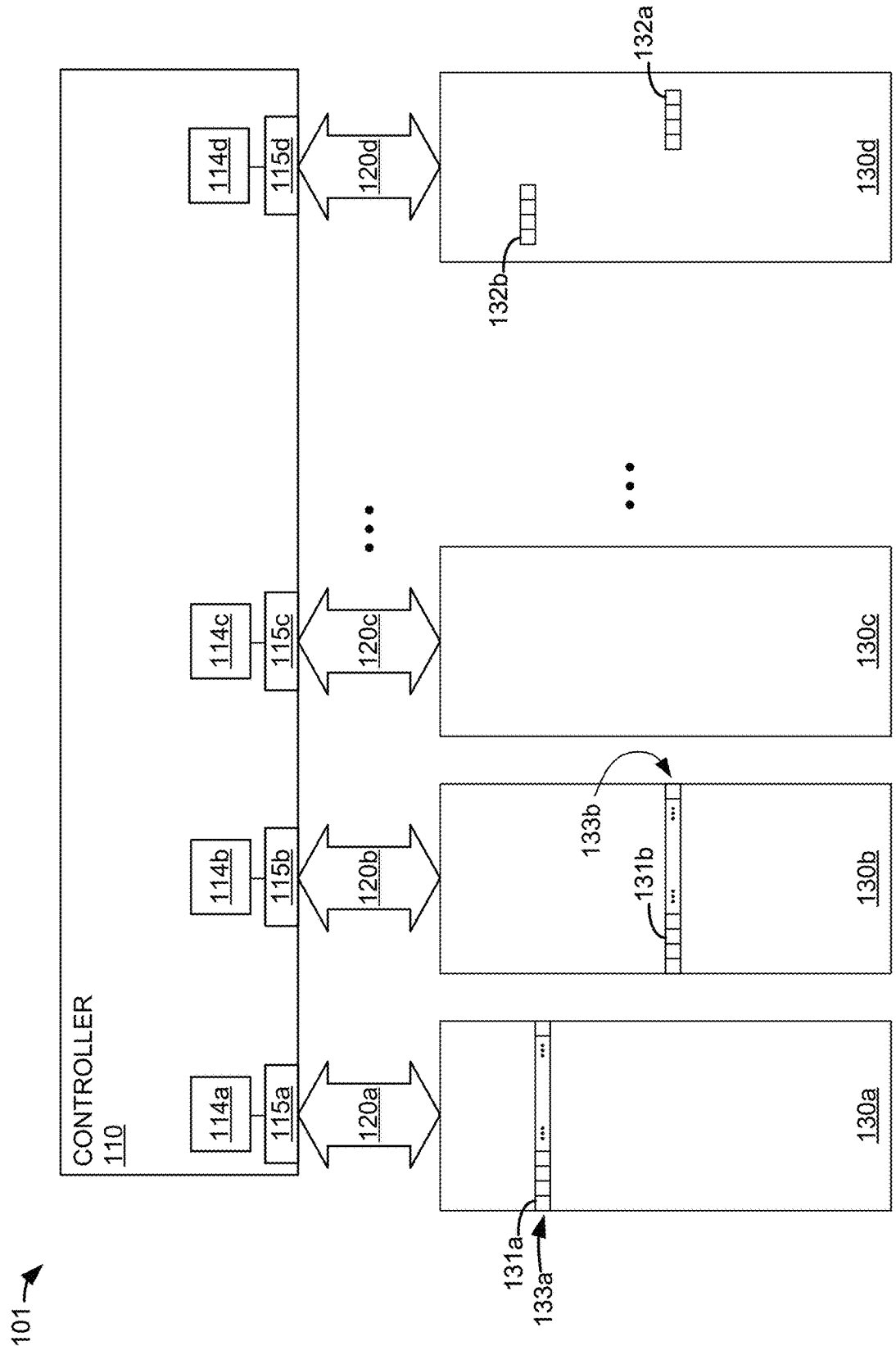
FIG. 1B illustrates a first example storage location relationship between data and error detection and correction information.

FIG. 1B illustrates a first example storage location relationship between data and error detection and correction information. FIG. 1B illustrates memory system 101 which is structurally similar to memory system 100, but is configured to store data using the first example storage location relationship between data and error detection and correction data. In FIG. 1B, controller 110 is configured to store the data for a single access request in a single row 133a-133b of a single memory device 130a-130c. The error detection and correction information for all of the data memory devices 130a-130c is stored in a single, dedicated, memory device 130d.

This is illustrated in FIG. 1B by the data 131a (a.k.a., data word group) for a first access (e.g., burst) being stored contiguously in row 133a of memory device 130a. The data 131b for a second access is stored contiguously in row 133b of memory device 130b. In an embodiment, data 131a and data 131b occupy at least one entire row 133a-133b. The error detection and correction data 132a (e.g., check bits) associated with the first access and the error detection and correction data 132b associated with the second access are both stored in dedicated error detection and correction memory device 130d. With this configuration, memory device 130d (and by extension channel 120d) provides the error detection and correction data for the data in the remaining memory devices 130a-130c (and by extension channels 120a-120c). In an embodiment, the error detection and correction data stored in memory device 130d stores the error detection and correction data associated with 8 other memory devices 130a-130c. However, because only a single data memory device 130a-130c and the single error detection and correction memory device 130d is accessed per request, at most 2 devices need to activate a row-thereby reducing the power consumption when compared to requests that activate 9 rows (i.e., 1 row per device for all 9 devices).

It should be understood that the ratio of data channels to error detection and correction channels can be selected according to the application and/or expected data traffic pattern. For example, requests to error detection and correction channel 120d can be for a smaller amount of data than the requests to the data channels. For example, for every 8 bytes requested from data channel 120a, controller 110 may only request a single byte from error detection and correction data channel 120d. In another example, the dedicated error detection and correction channel 120d may hold the error detection and correction data for a smaller number of data channels 120a-120c (e.g., error detection and correction channel 120d holds the error detection and correction data for only 4 data channels 120a-120c.) This may result in a less efficient use of the memory on error detection and correction memory device 120d. However, the number of conflicts resulting from the use of only a single channel for error detection and correction data may be reduced when compared to a data channel to error detection and correction channel ration of 8:1. Conflicts can occur when controller 110 wants to access a data memory channel 120a-120c while the error detection and correction channel 120d is still busy with a previous request. For example, when controller 110 wants to access memory channel 120b, but error detection and correction channel 120d is currently busy providing data for an access on data channel 120a, controller 110 may need to wait until error detection and correction channel 120d is no longer busy to complete, and check the result with error detection and correction data, controller 110's access to memory channel 120b.

In an embodiment, the error detection and correction data stored in error detection and correction memory device 130d can be arranged according to an expected access pattern. For example, if it is expected that controller 110 will make multiple sequential accesses to the same row, but on different memory devices, controller 110 may store all of the error detection and correction data for those rows in the corresponding row of error detection and correction device 130d. In this manner, the corresponding row in error detection and correction device 130d only needs to be accessed/activated once by controller 110 to satisfy the error detection and correction data requirements of these accesses.

Figure 1C:
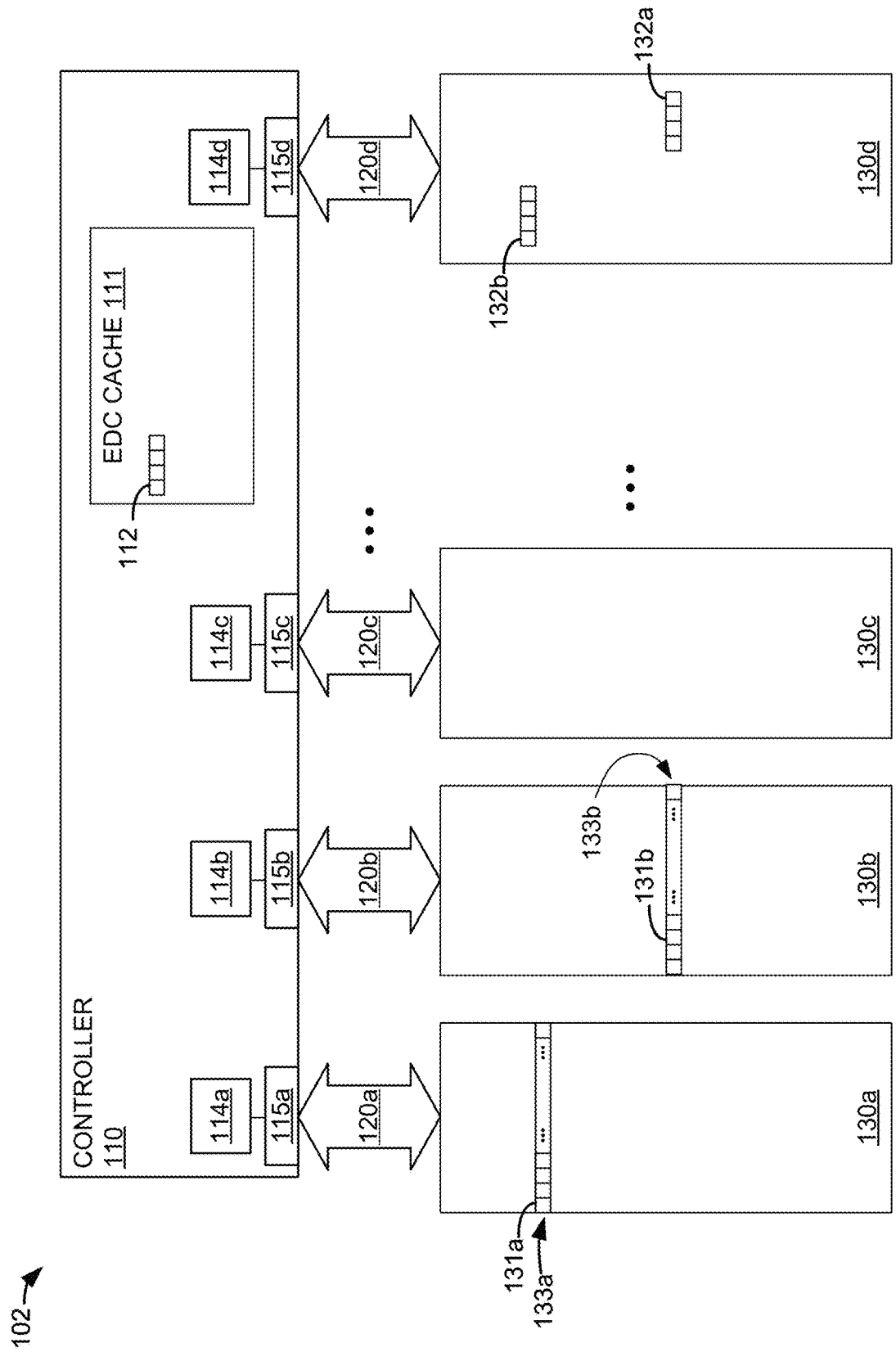
FIG. 1C illustrates the use of an error detection and correction data cache.

FIG. 1C illustrates the use of an error detection and correction data cache. FIG. 1C illustrates memory system 102 which is structurally similar to memory system 100, but is configured to use an error detection and correction data cache 111 to reduce access conflicts while accessing error detection and correction data 132a-132b stored in error detection and correction data memory device 130d. Controller 110 may include (or be coupled with) a cache memory 111 to hold error detection and correction data from error detection and correction memory device 130d. This can reduce the conflicts on error detection and correction channel 120d by providing recently used error detection and correction data 112 from error detection and correction cache 111 rather than requiring an access to error detection and correction memory device 130d.

The arrangement/design of error detection and correction cache 111 may be selected according to the application and/or expected data traffic pattern. For example, error detection and correction cache 111 may comprise a single line or row of cached error detection and correction data 112 (from error detection and correction channel 120d) dedicated to each data channel 120a-120c. In another example, the entirety of error detection and correction cache 111 may support caching of error detection and correction data associated with all data channels 120a-120c. Error detection and correction cache 111 may, in this case, have a large storage capacity (e.g., 64 KB) and have multiple cache ways (e.g. 4-way set associative cache.)

Figure 1D:
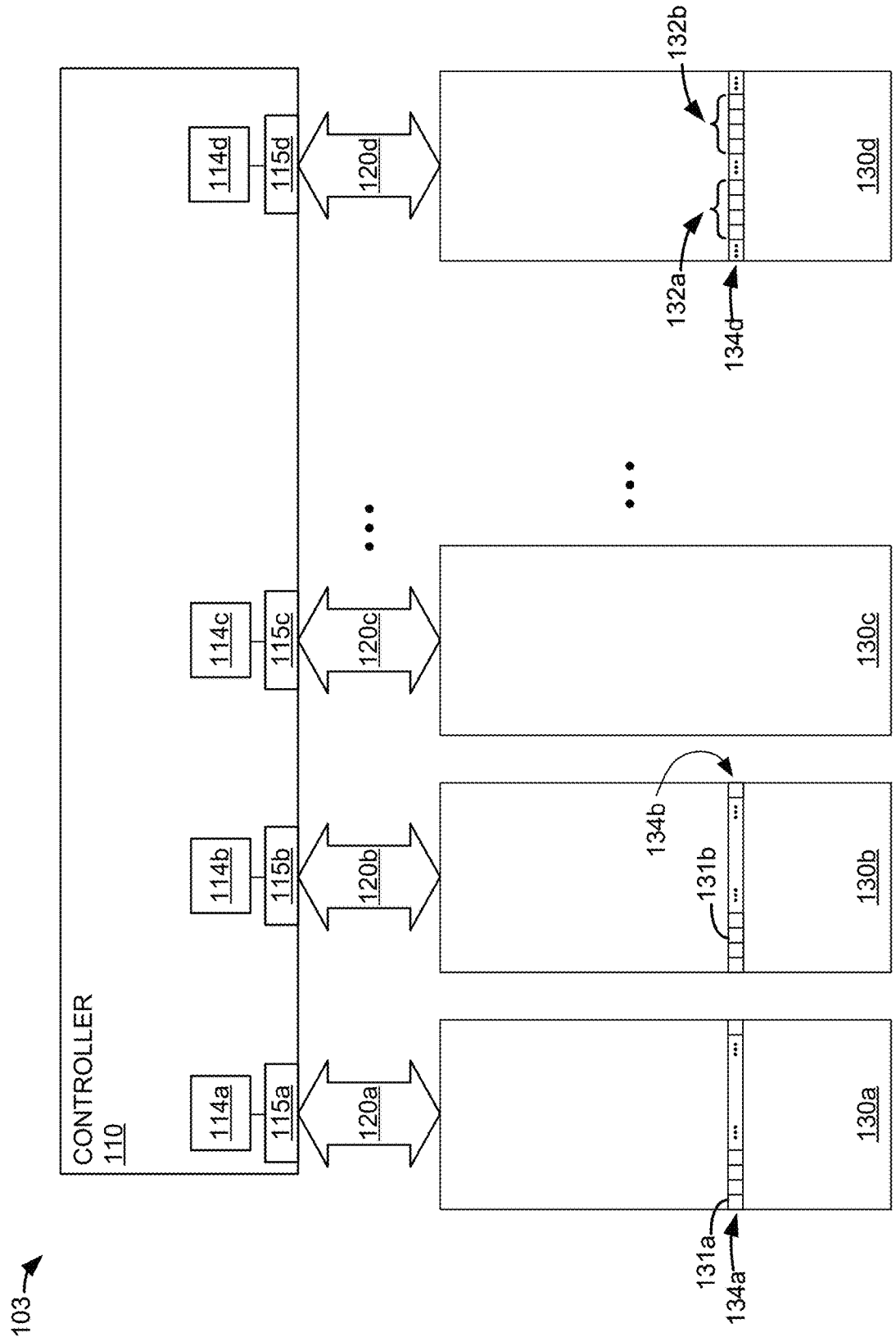
FIG. 1D illustrates a second example storage location relationship between data and error detection and correction information.

FIG. 1D illustrates a second example storage location relationship between data and error detection and correction information. FIG. 1D illustrates memory system 103 which is structurally similar to memory system 100, but is configured to store data using the second example storage location relationship between data and error detection and correction data. In FIG. 1D, row 134a in memory device 130a and row 134b in memory device 130b have the same row addresses. In this example, controller 110 stores the error detection and correction data 132a associated with data 131a in row 134a of memory device 130a and the error detection and correction data 132b associated with data 131b in row 134b of memory device 130b in the same row 134d of error detection and correction memory device 130d.

Figure 1E:
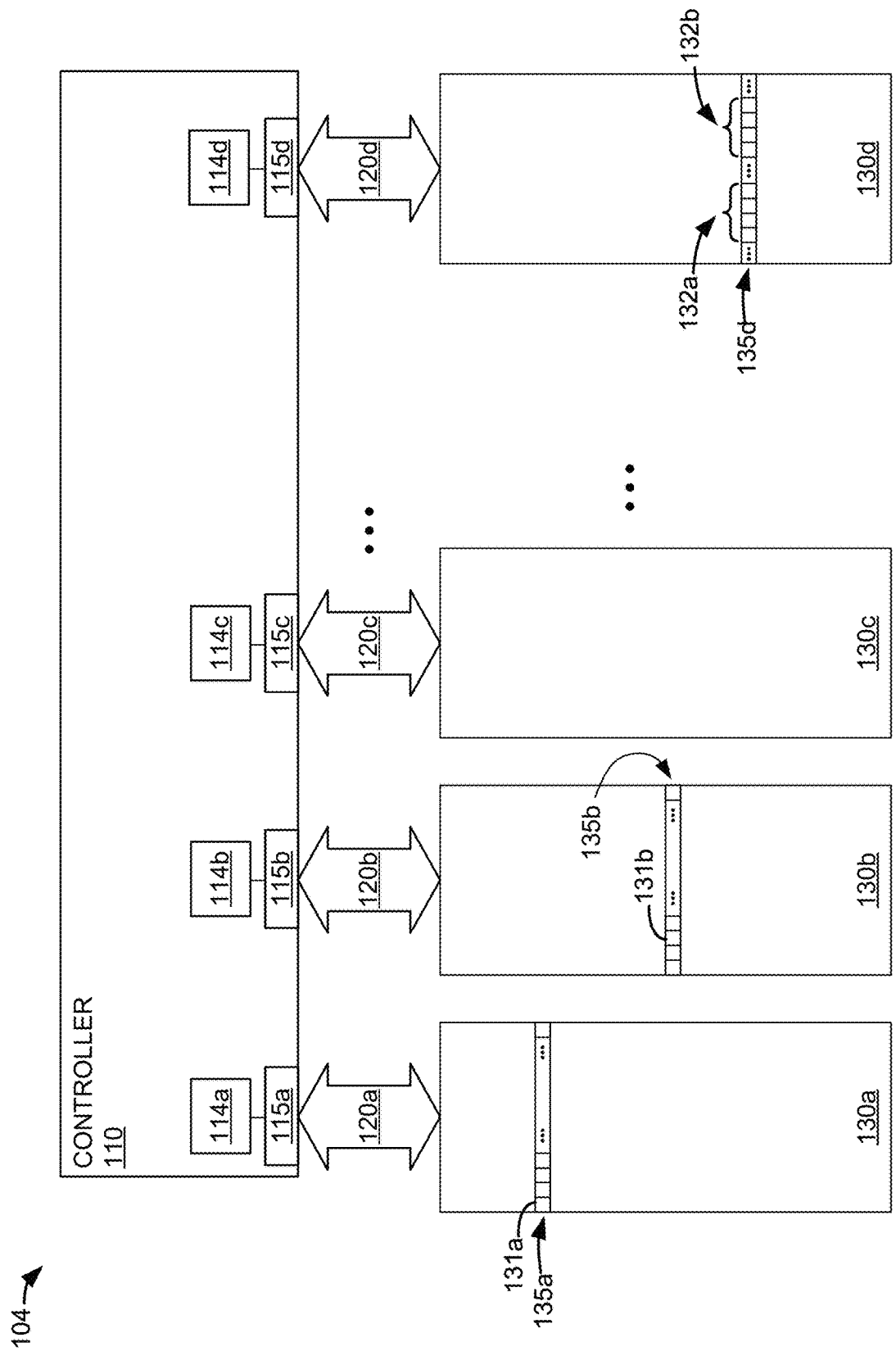
FIG. 1E illustrates a third example storage location relationship between data and error detection and correction information.

FIG. 1E illustrates a third example storage location relationship between data and error detection and correction information. FIG. 1E illustrates memory system 103 which is structurally similar to memory system 100, but is configured to store data using the third example storage location relationship between data and error detection and correction data. In FIG. 1E, row 135a in memory device 130a that is storing data 131a, and row 135b in memory device 130b that is storing data 131b, have different row addresses. However, in this example, controller 110 stores the error detection and correction data 132a associated with data 131a and the error detection and correction data 132b associated with data 131b in the same row 135d in error detection and correction memory device 130d. Controller 110 may store the error detection and correction data 132a associated with data 131a and the error detection and correction data 132b associated with data 132a in row 135d according to, for example, a hashing function that is based on, for example, both the row address and a data channel 120a-120c address.

Figure 1F:
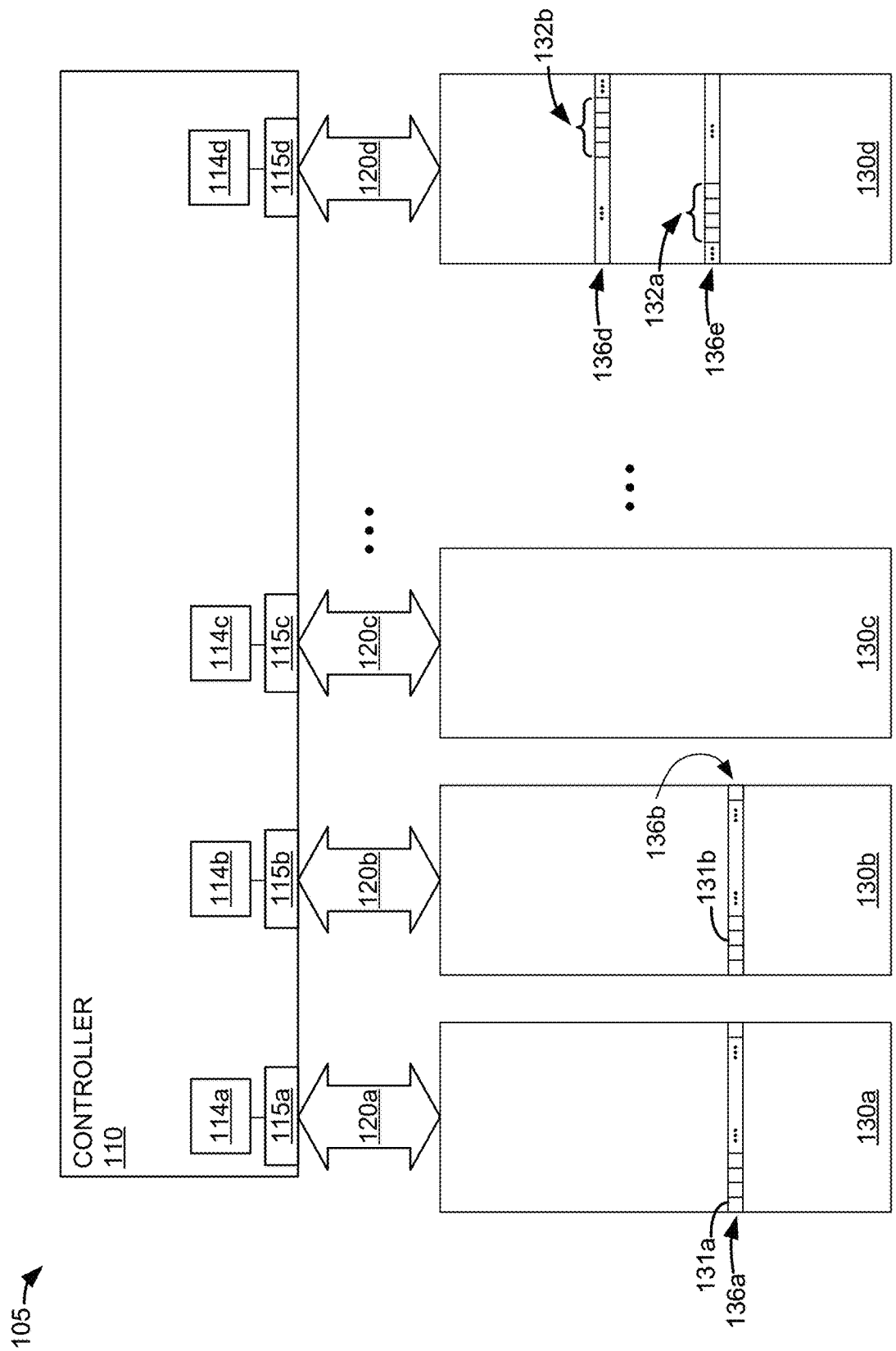
FIG. 1F illustrates a fourth example storage location relationship between data and error detection and correction information.

FIG. 1F illustrates a fourth example storage location relationship between data and error detection and correction information. FIG. 1F illustrates memory system 103 which is structurally similar to memory system 100, but is configured to store data using the fourth example storage location relationship between data and error detection and correction data. In FIG. 1D, row 136a in memory device 130a that is storing data 131a and row 136b in memory device 130b that is storing data 131b have the same row addresses. In this example, controller 110 stores the error detection and correction data 132a associated with data 131a in row 136e and the error detection and correction data 132b associated with data 132a in a different row 136d of error detection and correction memory device 130d.

FIG. 2 is a flowchart illustrating method of accessing data and error detection and correction information. The steps illustrated in FIG. 2 may be performed by controller 110 and/or one or more elements of systems 100-105. By a controller, memory devices are accessed that are on a set of memory channels that each include command, address, and data transfer functions that operate independently of the command, address, and data transfer functions of the other channels in the set of memory channels (202). For example, controller 110 may access memory devices 130a-130d that are connected respectively to memory channels 120a-120d. Memory channels 120a-120d each include command, address, and data transfer functions that operate independently of the other of memory channels 120a-120d.

By the controller, a first memory channel of the set of memory channels is accessed to receive a first data word group that is stored contiguously in a first row of a first memory device coupled to the memory channel (204). For example, controller 110 may access memory channel 120a to receive data word group 131*a* where data word group 130*a* is stored contiguously in row 133*a* of memory device 130*a*.

By the controller, and concurrently with the accessing of the first memory channel, an error correction data channel is accessed to receive a first set of check bits associated with the first data word group (206). For example, concurrently with accessing channel 120*a* to receive data word group 131*a*, controller 110 may access error detection and correction channel 120*d* to receive error detection and correction data 132*a* that is associated with data word group 131*a*.

Figure 3:
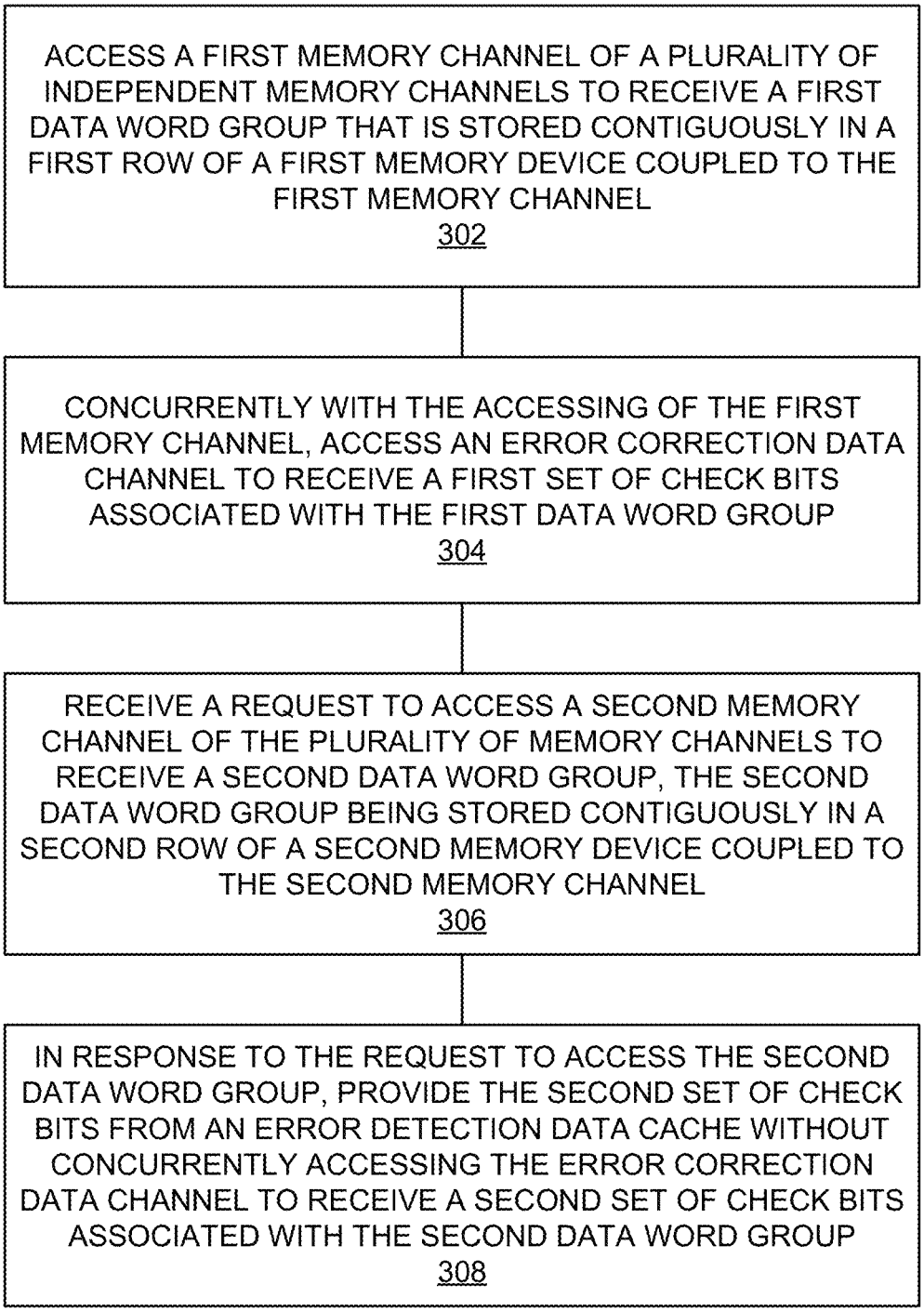
FIG. 3 is a flowchart illustrating a method of using cached error detection and
correction information.

FIG. 3 is a flowchart illustrating a method of using cached error detection and correction information. The steps illustrated in FIG. 3 may be performed by controller 110 and/or one or more elements of systems 100-105. A first memory channel of a plurality of independent memory channels is accessed to receive a first data word group that is stored contiguously in a first row of a first memory device couple to the first memory channel (302). For example, controller 110 may access memory channel 120*b* in order to read data word group 131*b* from row 133*b* of memory device 130*b*.

Concurrently with accessing the first memory channel, an error correction data channel is accessed to receive a first set of check bits associated with the first data word group (304). For example, controller 110 may access memory channel 120*d* in order to read error detection and correction data 132*b* that is associated with data word group 131*b*. The error detection and correction data 132*b* may be used to detect and/or correct errors in data word group 131*b*.

A request to access a second memory channel of the plurality of memory channels to receive a second data word group is received, the second data word group being stored contiguously in a second row of a second memory device coupled to the second memory channel (306). For example, controller 110 may receive a request (e.g., from a processor etc.) directed to reading data word group 131*a* from channel 120*a* which is stored contiguously in row 133*a* of memory device 130*a*. In response to this request, controller 110 may access channel 120*a* and receive data word group 131*a* from memory device 130*a*.

In response to the request to access the second data word group, a second set of check bits is provided from an error detection data cache without concurrently accessing the error correction data channel to receive a second set of check bits associated with the second data word group (308). For example, in response to a request to read a data channel 120*a*, controller 110 may query error detection and correction cache 111 to determine if a cached copy 112 of error detection and correction data 132*a* associated with the request is stored in error detection and correction cache 111. If a cached copy 112 of the error detection and correction data 132*a* that is associated with the requested data word group is present in error detection and correction cache 111, controller 110 may forego accessing error detection and correction memory channel 120*d*. Instead, controller 110 may retrieve the cached copy 112 of error detection and correction data 132*a* (without concurrently accessing error detection and correction data channel 120*d* and/or error detection and correction memory device 130*d*) and use this copy to detect and/or correct errors in data word group 131*a*.

Figure 4:
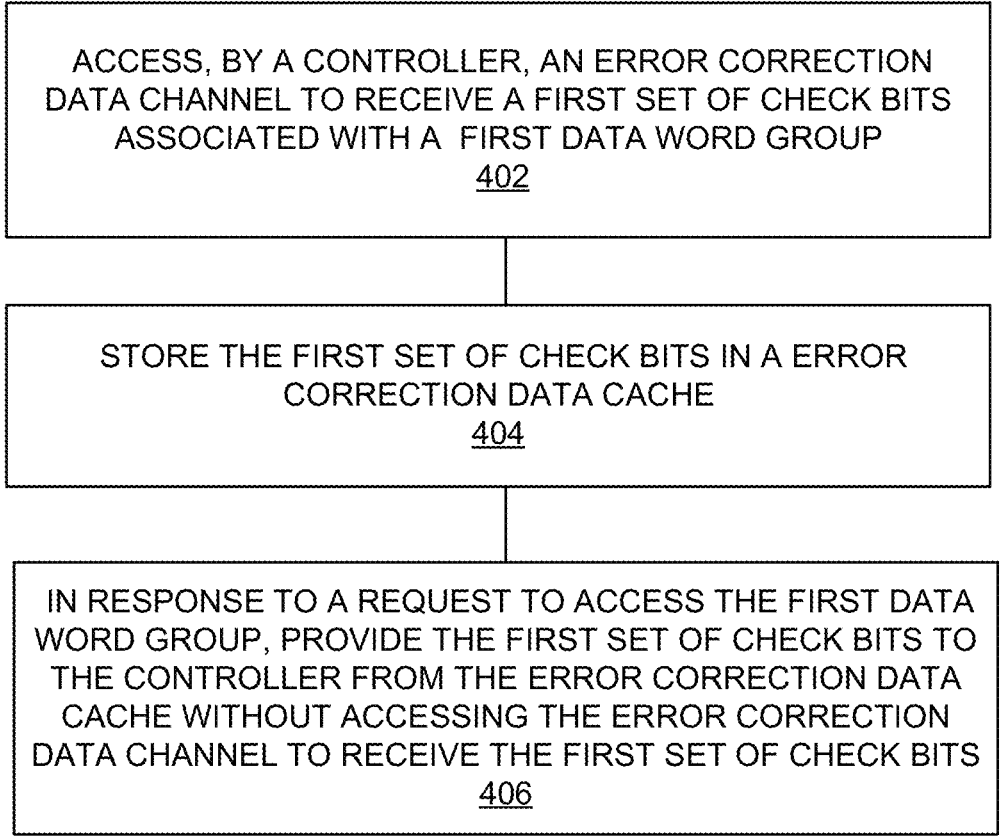
FIG. 4 is a flowchart illustrating a method of caching and using error detection and correction information.

FIG. 4 is a flowchart illustrating a method of caching and using error detection and correction information. The steps illustrated in FIG. 4 may be performed by controller 110 and/or one or more elements of systems 100-105. By a controller, an error correction data channel is accessed to receive a first set of check bits associated with a first data word group (402). For example, controller 110 may access error detection and correction data channel 120*d* in order to receive error detection and correction data 132*a* from error detection and correction memory device 130*d*. Controller 110 may retrieve error detection and correction data 132*a* and store a copy 112 in error detection and correction cache 111 in response to a request for the corresponding data word group 131*a*.

The first set of check bits are stored in an error correction data cache (404). For example, controller 110 may store a copy 112 of error detection and correction data 132*a* in error detection and correction cache 111. Controller 110 may retrieve error detection and correction data 132*a* and store a copy 112 in error detection and correction cache 111 in response to a request for word group (e.g., 131*b*) that is not associated with error detection and correction data 132*a*, but has its error detection and correction data (e.g., 132*a*) stored in the same row (e.g., row 135*d* in FIG. 1E) as error detection and correction data 132*a*. Controller 110 may retrieve error detection and correction data 132*a* and store a copy 112 in error detection and correction cache 111 as part of a process of populating error detection and correction cache 111. Controller 110 may retrieve error detection and correction data 132*a* and store a copy 112 in error detection and correction cache 111 as part of a process of populating error detection and correction cache 111 during otherwise unused access cycles on error detection and correction data channel 120*d*.

In response to a request to access the first data word group, the first set of check bits are provided to the controller from the error correction data cache without accessing the error correction data channel to receive the first set of check bits (406). For example, in response to a request to read data channel 120*a* in order to receive data word group 131*a* from memory device 130*a*, controller 110 may query error detection and correction cache 111 to determine if a cached copy 112 of error detection and correction data 132*a* associated with data word group 131*a* is stored in error detection and correction cache 111. If a cached copy 112 of the error detection and correction data 132*a* (which is associated with data word group 131*a*) is present in error detection and correction cache 111, controller 110 may forego accessing error detection and correction memory channel 130*d*. Instead, controller 110 may retrieve the cached copy 112 of error detection and correction data 132*a* (without concurrently accessing error detection and correction data channel 120*d* and/or error detection and correction memory device 130*d*) and use this copy 112 to detect and/or correct errors in data word group 131*a*.

FIG. 5 is a flowchart illustrating a method of accessing error detection and correction information from an open row. The steps illustrated in FIG. 5 may be performed by controller 110 and/or one or more elements of systems 100-105. By a controller, a row of a memory device on an error correction data channel is opened (502). For example, in response to a request to access a data word group, controller 110 may open row 134*d* of error detection and correction memory device 130*d*. Row 134*d* of error detection and correction memory device may store error detection and correction data (e.g., error detection and correction data 132*a*, 132*b*) for data word groups (e.g., data word groups 131*a* and 131*b*) that are stored in corresponding rows (i.e., have the same row address) of data memory devices 130*a*-130*c*.

By the controller, a first memory channel of a plurality of independent memory channels is accessed to receive a first data word group that is stored contiguously in a first row of a first memory device coupled to the first memory channel where the first row corresponds to the row of the memory device on the error correction data channel (504). For example, controller 110 may access data memory channel 120*a* in order to receive data word group 131*a*, which is stored contiguously in row 134*a*, where error detection and correction data 132*a* for data word group 131*a* is stored in row 134*d*-which has the same row address as data row 134*a*.

By the controller, a first set of check bits associated with the first data word group are received from the open row of the memory device on the error correction data channel (506). For example, error detection and correction data 132*a* which is associated with data word group 131*a* may be received by controller 110 via error detection and correction data channel 120*d*.

By the controller, a second memory channel of a plurality of independent memory channels is accessed to receive a second data word group that is stored contiguously in a second row of a second memory device coupled to the second memory channel where the second row corresponds to the row of the memory device on the error correction data channel (508). For example, controller 110 may access data memory channel 120*b* in order to receive data word group 131*b*, which is stored contiguously in row 134*b*, where error detection and correction data 132*b* for data word group 131*b* is stored in row 134*d*-which has the same row address as data rows 134*a* and 134*b*.

By the controller, a second set of check bits associated with the second data word group are received from the open row of the memory device on the error correction data channel (510). For example, error detection and correction data 132*b* which is associated with data word group 131*b* may be received by controller 110 via error detection and correction data channel 120*d*.

FIG. 6 is a flowchart illustrating another method of accessing error detection and correction information from an open row. The steps illustrated in FIG. 6 may be performed by controller 110 and/or one or more elements of systems 100-105. By a controller, a row of a memory device on an error correction data channel is opened (602). For example, in response to a request to access a data word group, controller 110 may open row 135*d* of error detection and correction memory device 130*d*. Row 135*d* of error detection and correction memory device may store error detection and correction data (e.g., error detection and correction data 132*a*, 132*b*) for data word groups (e.g., data word groups 131*a* and 131*b*). Whether row 135*d* of error detection and correction memory device may store error detection and correction data (e.g., error detection and correction data 132*a*, 132*b*) for particular data word groups (e.g., data word groups 131*a* and 131*b*) depends on the configuration of controller 110.

By the controller, a first memory channel of a plurality of independent memory channels is accessed to receive a first data word group that is stored contiguously in a first row of a first memory device coupled to the first memory channel (604). For example, controller 110 may access data memory channel 120*a* in order to receive data word group 131*a* which is stored contiguously in row 135*a*.

By the controller, a first set of check bits associated with the first data word group are received from the open row of the memory device on the error correction data channel (606). For example, error detection and correction data 132*a*, which is associated with data word group 131*a*, may be received by controller 110 via error detection and correction data channel 120*d*.

By the controller, a second memory channel of a plurality of independent memory channels is accessed to receive a second data word group that is stored contiguously in a second row of a second memory device coupled to the second memory channel (608). For example, controller 110 may access data memory channel 120*b* in order to receive data word group 131*b*, which is stored contiguously in row 135*b*.

By the controller, a second set of check bits associated with the second data word group are received from the open row of the memory device on the error correction data channel (610). For example, error detection and correction data 132*b* which is associated with data word group 131*b* may be received by controller 110 via error detection and correction data channel 120*d*.

The methods, systems and devices described above may be implemented in computer systems, or stored by computer systems. The methods described above may also be stored on a non-transitory computer readable medium. Devices, circuits, and systems described herein may be implemented using computer-aided design tools available in the art, and embodied by computer-readable files containing software descriptions of such circuits. This includes, but is not limited to one or more elements of systems 100-105, controller 110, and their components. These software descriptions may be: behavioral, register transfer, logic component, transistor, and layout geometry-level descriptions. Moreover, the software descriptions may be stored on storage media or communicated by carrier waves.

Data formats in which such descriptions may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email. Note that physical files may be implemented on machine-readable media such as: 4 mm magnetic tape, 8 mm magnetic tape, 3½ inch floppy media, CDs, DVDs, and so on.

Figure 7:
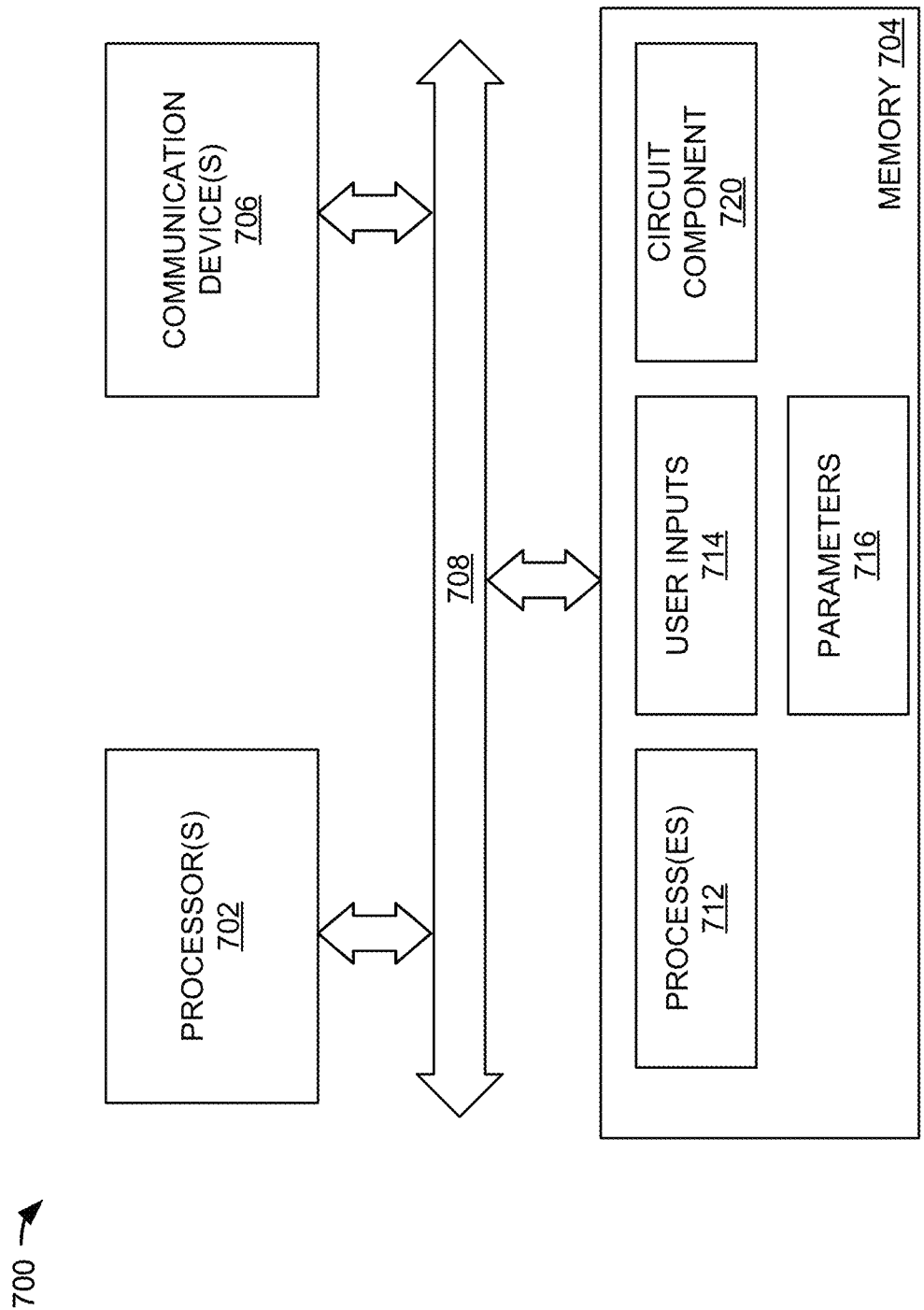
FIG. 7 is a block diagram of a processing system.

FIG. 7 is a block diagram illustrating one embodiment of a processing system 700 for including, processing, or generating, a representation of a circuit component 720. Processing system 700 includes one or more processors 702, a memory 704, and one or more communications devices 706. Processors 702, memory 704, and communications devices 706 communicate using any suitable type, number, and/or configuration of wired and/or wireless connections 708.

Processors 702 execute instructions of one or more processes 712 stored in a memory 704 to process and/or generate circuit component 720 responsive to user inputs 714 and parameters 716. Processes 712 may be any suitable electronic design automation (EDA) tool or portion thereof used to design, simulate, analyze, and/or verify electronic circuitry and/or generate photomasks for electronic circuitry. Representation 720 includes data that describes all or portions of systems 100-105, controller 110, and their components, as shown in the Figures.

Representation 720 may include one or more of behavioral, register transfer, logic component, transistor, and layout geometry-level descriptions. Moreover, representation 720 may be stored on storage media or communicated by carrier waves.

Data formats in which representation 720 may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email User inputs 714 may comprise input parameters from a keyboard, mouse, voice recognition interface, microphone and speakers, graphical display, touch screen, or other type of user interface device. This user interface may be distributed among multiple interface devices. Parameters 716 may include specifications and/or characteristics that are input to help define representation 720. For example, parameters 716 may include information that defines device types (e.g., NFET, PFET, etc.), topology (e.g., block diagrams, circuit descriptions, schematics, etc.), and/or device descriptions (e.g., device properties, device dimensions, power supply voltages, simulation temperatures, simulation models, etc.).

Memory 704 includes any suitable type, number, and/or configuration of non-transitory computer-readable storage media that stores processes 712, user inputs 714, parameters 716, and circuit component 720.

Communications devices 706 include any suitable type, number, and/or configuration of wired and/or wireless devices that transmit information from processing system 700 to another processing or storage system (not shown) and/or receive information from another processing or storage system (not shown). For example, communications devices 706 may transmit circuit component 720 to another system. Communications devices 706 may receive processes 712, user inputs 714, parameters 716, and/or circuit component 720 and cause processes 712, user inputs 714, parameters 716, and/or circuit component 720 to be stored in memory 704.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A controller, comprising:
at least three memory channel interfaces that are to operate independently of accesses that occur via the other of the at least three memory channel interfaces, the at least three memory channel interfaces including a first memory channel interface, a second memory channel interface, and an error detection and correction channel interface, the first memory channel interface to access a first data word group that is stored contiguously in a first row of a first memory device coupled to the first memory channel interface concurrently with the error detection and correction channel interface accessing a first set of check bits associated with the first data word group and a second set of check bits associated with a second data word group that is stored contiguously in a second row of a second memory device coupled to the second memory channel interface; and
an error detection and correction data cache to cache the second set of check bits that was accessed concurrently with the first data word group.

2. The controller of claim 1, wherein the an error detection and correction data cache is to also cache the first set of check bits that was accessed concurrently with the first data word group.

3. The controller of claim 1, wherein the first set of check bits and the second set of check bits are stored in a third row of a memory device coupled to the error detection and correction channel interface.

4. The controller of claim 3, wherein a first row address addresses the first row, a second row address addresses the second row, and a third row address addresses the third row.

5. The controller of claim 4, wherein the third row address is not equal to the first row address.

6. The controller of claim 5, wherein the third row address is not equal to the second row address.

7. The controller of claim 2, wherein the at least three memory channel interfaces each include command, address, and data transfer functions that operate independently of the command, address, and data transfer functions of other ones of the at least three memory channel interfaces.

8. A controller, comprising:
a plurality of memory channel interfaces that are to access a respective plurality of memory components independently of accesses to others of the respective plurality of memory components via the other memory channel interfaces, the plurality of memory channel interfaces including an error detection and correction data channel interface to open a row storing a first group of check bits and a second group of check bits stored in an error detection and correction (EDC) memory component that is a first one of the respective plurality of memory components, the first group of check bits used to check data stored in a first single row, addressed by a first row address, of a first data memory component accessed via a first one of the plurality of memory channel interfaces, the first data memory component being a second one of the respective plurality of memory components, the second group of check bits to be used to check data stored in a second single row, addressed by a second row address, of a second data memory component accessed via a second one of the plurality of memory channel interfaces, the second data memory component being a third one of the respective plurality of memory components, where the first single row is accessed while the row storing the first group of check bits and the second group of check bits is open; and
an error detection and correction data cache to cache the second set of check bits by accessing the second set of check bits based on the row storing the first group of check bits and the second group of check bits being open to access the first single row to access the first group of check bits.

9. The controller of claim 8, wherein the controller is to concurrently access the first group of check bits and the second group of check bits.

10. The controller of claim 8, wherein the row storing the first group of check bits and the second group of check bits is addressed by a third row address.

11. The controller of claim 10, wherein the first row address and the third row address are not equal.

12. The controller of claim 11, wherein the second row address and the third row address are not equal.

13. The controller of claim 10, wherein the first row address and the third row address are equal.

14. The controller of claim 13, wherein the second row address and the third row address are equal.

15. A method of operating a controller, comprising:
- opening, via an error detection and correction (EDC) channel interface, a first EDC row of an EDC memory device coupled to the EDC channel interface, the first EDC row storing a first set of check bits and a second set of check bits;
- accessing, while the first EDC row is open and via a first memory channel interface coupled to a first memory channel, a first data word group that is stored contiguously by a first row of a first memory component that is coupled to the first memory channel, the first row addressed by a first row address;
- accessing, while the first EDC row is open via the EDC channel interface, the first set of check bits from the first EDC row;
- accessing, while the first EDC row is open to access the first set of check bits and via the EDC channel interface, the second set of check bits from the first EDC row;
- caching the second set of check bits in an error detection and correction data cache; and
- using the first set of check bits to check the first data word group.

16. The method of claim 15, further comprising:
- based on accessing the first set of check bits to check the first data word group, caching the first set of check bits in the error detection and correction data cache.

17. The method of claim 15, wherein the first set of check bits and the second set of check bits are accessed concurrently from the first EDC row.

18. The method of claim 15, wherein the first EDC row of the EDC memory device is not addressed by the first row address.

19. The method of claim 15, wherein a second data word group that is stored contiguously by a second row of a second memory component that is coupled to a second memory channel is checked by the second set of check bits.

20. The method of claim 15, wherein the first EDC row is addressed by the first row address.

* * * * *